United States Patent [19]
Oono et al.

[11] Patent Number: 5,548,710
[45] Date of Patent: Aug. 20, 1996

[54] METHOD AND APPARATUS FOR AN ISDN COMMUNICATION SYSTEM USING ACTIVE AND STAND-BY ISDN COMMUNICATION ADAPTORS TO MAINTAIN OPERATION WHEN TROUBLE OCCURS

[75] Inventors: Shuuji Oono, Kawasaki; Katsumi Tadamura, Shobara; Syoji Yamaguchi, Hitachi, all of Japan

[73] Assignee: Hitachi, Ltd., Tokyo, Japan

[21] Appl. No.: 788,319

[22] Filed: Nov. 5, 1991

[30] Foreign Application Priority Data

Nov. 7, 1990 [JP] Japan ................................ 2-301674

[51] Int. Cl.$^6$ ......................................... G06F 11/00
[52] U.S. Cl. ............................ 395/181; 371/20.1
[58] Field of Search ..................... 371/8.2, 8.1, 11.2; 370/16; 340/827; 379/273

[56] References Cited

U.S. PATENT DOCUMENTS

| | | | |
|---|---|---|---|
| 4,688,214 | 8/1987 | DeWitt et al. | 370/94 |
| 4,722,082 | 1/1988 | Furuya et al. | 370/85 |
| 4,736,364 | 4/1988 | Basso et al. | 370/68.1 |
| 4,930,123 | 5/1990 | Shimizu | 370/94.1 |
| 4,965,795 | 10/1990 | Coffelt et al. | 370/110.2 |
| 4,985,891 | 1/1991 | Fujiwara et al. | 370/110.1 |
| 5,125,082 | 6/1992 | Fujiwara | 395/325 |

Primary Examiner—Hoa T. Nguyen
Attorney, Agent, or Firm—Antonelli, Terry, Stout & Kraus

[57] ABSTRACT

A trouble processing method of ISDN communication system using an ISDN (Integrated Services Digital Network) and a control apparatus of ISDN communication system. Among a plurality of ISDN communication adapters included in an ISDN communication control apparatus, the same TEI (Terminal Endpoint Identifier) value as that of an active ISDN communication adapter is assigned to its stand-by ISDN communication adapter. The stand-by ISDN communication adapter is made to operate in the same manner as the active ISDN communication adapter with the exception of interruption of transmission of an LAPD (Link Access Producer on the D-channel) to an ISDN. The stand-by ISDN communication adapter is held in the same communication state as the active communication adapter. When a trouble has occurred in the active ISDN communication adapter, the interruption of transmission of the LAPD frame is cancelled and the stand-by ISDN communication adapter is activated as the active ISDN communication adapter. As a result, data communication using an ISDN can be conducted, and recovery processing at the time of occurrence of a trouble in an ISDN communication adapter can be rapidly executed without making the other party of communication conscious of it.

17 Claims, 13 Drawing Sheets

FIG. 6

COMMUNICATION ADAPTER MANAGEMENT TABLE

| SLOT NO. (21) | TEI (22) | OPERATION MODE (23) | OPERATION STATE (24) |
|---|---|---|---|
| 1 | O | SLAVE | STOP |
| 2 | O | SLAVE | STOP |
| 3 | O | SLAVE | STOP |
| 4 | O | SLAVE | STOP |
| 5 | O | SLAVE | STOP |
| 6 | O | SLAVE | STOP |
| 7 | O | SLAVE | STOP |
| 8 | O | SLAVE | STOP |

F I G. 12
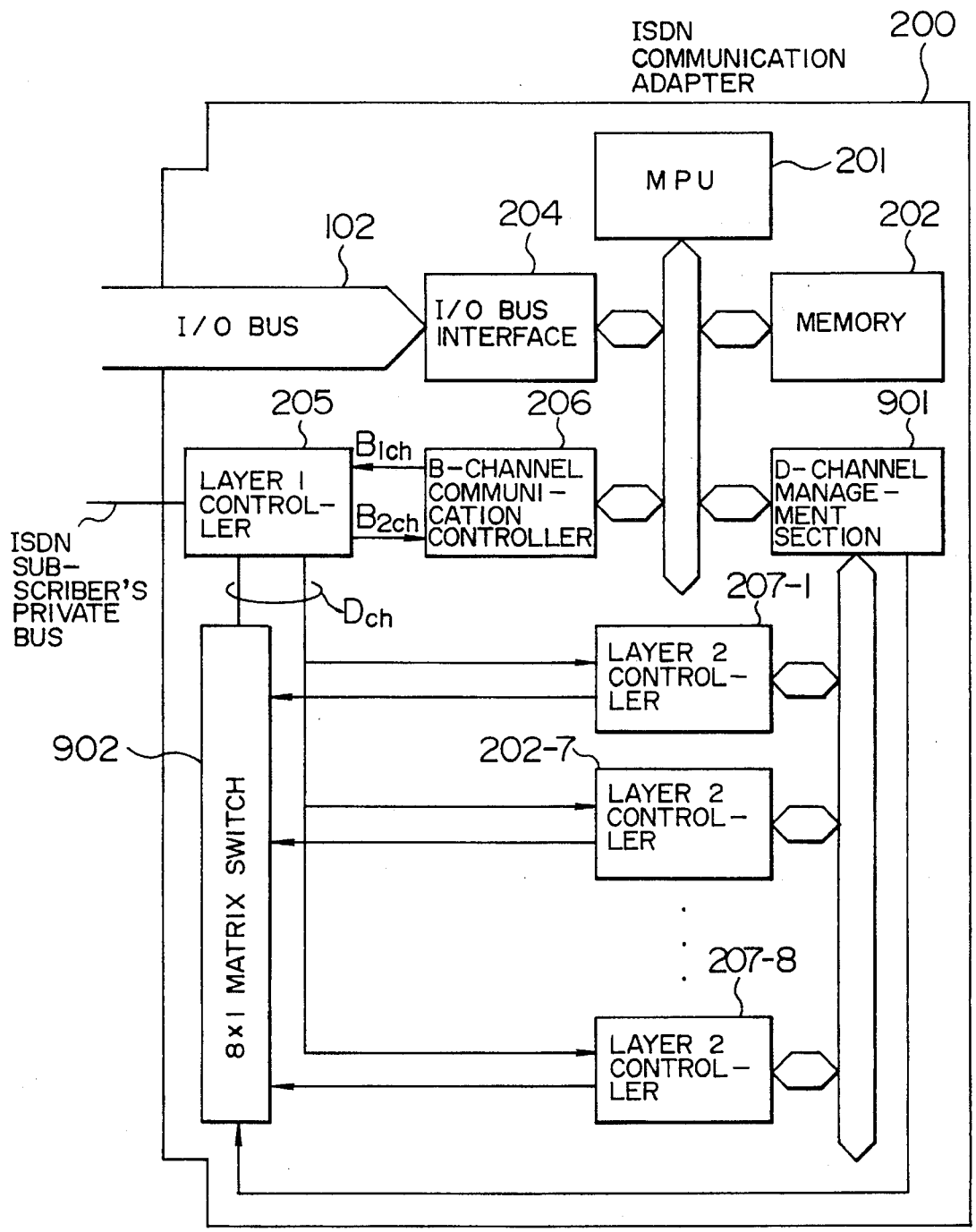

5,548,710

METHOD AND APPARATUS FOR AN ISDN COMMUNICATION SYSTEM USING ACTIVE AND STAND-BY ISDN COMMUNICATION ADAPTORS TO MAINTAIN OPERATION WHEN TROUBLE OCCURS

BACKGROUND OF THE INVENTION

The present invention relates to an ISDN communication system using ISDN (Integrated Services Digital Network) for data communication, and in particular to a technique for trouble processing in an ISDN communication system.

As a conventional technique for trouble processing in data communication systems using private lines, there is known a technique such as a method for recovery from trouble in line adaptor as described in JP-A-63-99653. In communication control apparatuses using this technique, one or more stand-by communication adapters are provided for a plurality of active communication adapters. Upon occurrence of a trouble in an active communication adapter, information set in the faulty communication adapter is restored in a stand-by communication adapter and communication processing is reopened. Thereby processing for recovery from trouble is performed while continuing the communication without bringing a line into a down state.

On the other hand, private lines have been used as communication lines in the data communication field. However, it is expected that ISDN (Integrated Services Digital Network) will be hereafter used widely. (In Japan, commercial service was started since 1987.)

The ISDN is a digital public network into which various communication services are integrated. In the same way as public lines such as telephone lines, communication is managed by using the unit referred to as call. At the time of start/end of communication, therefore, a call establishing/releasing procedure must be carried out.

In the above described conventional technique of restoring information, which has been set in a faulty communication adapter, in a stand-by communication adapter, a measure to meet the ISDN has not been considered. Thus this configuration is not suitable for communication systems using ISDN's allowing bus distribution.

That is to say, in the conventional technique described in the aforementioned JP-A-63-99653, lines are independent by taking hardware performing communication control as the unit and lines are switched. Upon occurrence of a line fault, therefore, lines must be switched. Accordingly, synchronous processing is needed, and there is a fear of delay caused by line switching.

Further, when a communication adapter has recovered from a trouble in case this conventional technique is applied to a communication system using ISDN, a new call establishing procedure must be carried out again to establish a call from a stand-by communication adapter.

This fact means use of lines which are physically and logically independent of those used before the occurrence of the trouble. Accordingly, there occurs a problem that the other party of the communication must be requested to perform line switching.

Further, the call used by the faulty communication adapter remains in use until the release procedure is carried out by the network or the other party of communication, resulting in another problem.

Further, if call establishment is performed whenever the communication adapter is switched, rapid switching processing cannot be conducted, resulting in still another problem.

SUMMARY OF THE INVENTION

A principal object of the present invention is to provide a fault tolerant ISDN communication system capable of performing data communication using an ISDN.

Another object of the present invention is to provide ISDN communication capable of rapidly carrying out recovery processing of a communication adapter at the time of occurrence of a trouble therein without making the other party of communication conscious of it.

In order to achieve the above described objects, the present invention provides a trouble processing method for ISDN communication system. In this trouble processing method, stand-by ISDN communication adapters are so adapted as to operate in the same way as active ISDN communication adapters excepting that transmission of a LAPD (Link Access Procedure on the D-channel) frame to the ISDN is interrupted. Thereby the stand-by ISDN communication adapters are held in the same communication state as that of the active ISDN communication adapters. Upon a trouble in an active communication adapter, the above described interruption of transmission of the LAPD frame is cancelled and a standby ISDN communication adapter is used as an active ISDN communication adapter.

In this case, the stand-by ISDN communication adapters are in a hot stand-by state with respect to the active ISDN communication adapters. In this way, the stand-by ISDN communication adapters are not used for data communication, but can be used in the same communication status as the active ISDN communication adapters.

Further, the present invention provides a communication control apparatus for controlling the communication between an information processing apparatus and a communication line. This ISDN communication control apparatus houses a plurality of ISDN communication adapters. Each of the ISDN communication adapters includes a layer 1 controller for performing the processing of a layer 1 on a communication protocol and a layer 2 controller for performing the processing of a layer 2 on the communication protocol. Each of the ISDN communication adapters is connected on a casing of the communication control apparatus to a subscriber's private bus of the same ISDN and an I/O bus which is an input/output bus with respect to the information processing apparatus.

In this ISDN communication control apparatus, it is desirable that the above described ISDN communication adapter has gate means for interrupting the transmission of LAPD frame data from the layer 2 controller to the layer 1 controller and a TEI value can be arbitrarily set therein.

Further, the ISDN communication control apparatus may include one or more aforementioned ISDN communication adapters each including a plurality of layer 2 controllers receiving LAPD frame data from the layer 1 controller and capable of respectively having different TEI values set therein. In each of the one or more communication adapters, the above described gate means is switch means for interrupting the transmission of the LAPD frame data from the plural layer 2 controllers or selectively connecting the LAPD frame data from the plural layer 2 controllers to the layer 1 controller.

Further, in order to achieve the above described objects, the present invention provides a first ISDN communication system including an information processing apparatus;

active ISDN communication adapters for controlling communication between the information processing apparatus and an ISDN; stand-by ISDN communication adapters connected to the same ISDN subscriber's private bus as that of the active ISDN communication adapters, having the same assigned TEI values as those of the action ISDN communication adapters, and having gate means for interrupting the transmission of a LAPD frame in the normal state; and means responsive to a trouble of an active ISDN communication adapter to cancel the transmission interruption of the LAPD frame of the above described gate means of its stand-by communication adapter.

Further, in order to achieve the above described objects, the present invention provides a second ISDN communication system. The second ISDN communication system includes an information processing apparatus, and a communication control apparatus having ISDN communication adapters which control communication between the information processing apparatus and the ISDN and which have the above described gate means.

In the second ISDN communication system, ISDN communication adapters of the above described communication apparatus which are used as stand-by ISDN communication adapters for some of active ISDN communication adapters have the same TEI values as those of the active ISDN communication adapters, and the above described gate means interrupts the transmission of LAPD frame data in the normal state.

In the second ISDN communication system, the above described information processing apparatus includes a management table for registering TEI values of the above described respective ISDN communication adapters and identifiers identifying whether the ISDN communication adapters are active or stand-by; means for, at the time of ordering the communication control apparatus to perform communication processing, ordering stand-by ISDN communication adapters serving as stand-by reserves for active ISDN communication adapters used for communication to perform the above described communication processing by referring to the above described management table and for thereafter ordering the active ISDN communication adapters to perform the same communication processing; and means responsive to a trouble of an active ISDN communication adapter to order the interruption of data transmission of the LAPD frame of the above described gate means of the stand-by communication adapters to be cancelled by referring to the above described management table and couple transmission of LAPD frame data of the layer 2 controller having the same TEI value as that of the active ISDN communication adapter to the layer 1 controller.

When a trouble has occurred in an active ISDN communication adapter, a stand-by ISDN communication adapter whereto the same TEI value as that of the active ISDN communication adapter has been assigned and which has been held in the same communication state as that of the active ISDN communication adapter is used as an active ISDN communication adapter in accordance with the trouble processing method of ISDN communication system according to the present invention. Therefore, establishment of a new call is unnecessary, and it is not necessary to restore communication state information of the faulty communication adapter in the stand-by ISDN communication adapter after the occurrence of the trouble. Accordingly, recovery processing at the time of occurrence of a trouble in a communication adapter can be rapidly carried out without making the other party of the communication conscious of it.

In normal communication, transmission of an LAPD frame from a stand-by ISDN communication adapter to the ISDN is interrupted. Therefore, the ISDN can operate without hindrance and without being conscious of stand-by communication adapters on the layer 2 or a higher layer.

Further, in a communication control apparatus according to the present invention, a plurality of ISDN communication adapters are connected on the casing of the communication control apparatus to the same ISDN subscriber's private bus and an I/O bus, which is an input/output bus with respect to the information processing apparatus. Therefore, an ISDN communication adapter can be used as a stand-by reserve of another ISDN communication adapter. If a communication system is constructed by using this communication control apparatus, therefore, a fault tolerant ISDN communication system can be formed.

If in addition one or more ISDN communication adapters in this ISDN communication control apparatus are so configured that TEI values may be arbitrarily set therein and those ISDN communication adapters are provided with gate means for interrupting the transmission of LAPD frame data from the layer 2 controller to the layer 1 controller, the above described trouble processing method in ISDN communication system according to the present invention can be realized satisfactorily and the recovery processing at the time of occurrence of a trouble in a communication adapter can be rapidly carried out without making the other party of communication conscious of it.

Further, if this ISDN communication adapter is provided with a plurality of layer 2 controllers in which different TEI values can be set respectively and the above described gate means is switch means for interrupting the transmission of LAPD frame data fed from the plural layer 2 controllers or selectively connecting the transmission of LAPD frame data to the layer 1 controller, one ISDN communication adapter can be used as stand-by reserves for other plural ISDN communication adapters.

Further, in the first ISDN communication system according to the present invention, the information processing apparatus performs communication by using active ISDN communication adapters under normal conditions. During this time, stand-by ISDN communication adapters operate in parallel with the active ISDN communication adapters. When a trouble has occurred in an active ISDN communication adapter, therefore, the communication which has been performed by that active ISDN communication adapter can be taken over by only cancelling the transmission interruption of the LAPD frame performed by the above described gate means of the stand-by ISDN communication adapter thereof.

In the second ISDN communication system according to the present invention, an ISDN communication adapter, which is included in ISDN communication adapters of the communication control apparatus and which is used as the stand-by reserve of a certain active ISDN communication adapter, has the same TEI value as that of that active ISDN communication adapter. With the exception of interruption of transmission of LAPD frame data performed by the above described gate means, the same communication state as that of the active ISDN communication adapter is maintained in that stand-by ISDN communication adapter.

When a trouble has occurred in the active ISDN communication adapter, therefore, the communication which has been performed by the active ISDN communication adapter can be taken over without hindrance by only cancelling the transmission interruption of the LAPD frame performed by the above described gate means of the stand-by ISDN communication adapter thereof and coupling the transmission of the LAPD frame data of the layer 2 controller having the same TEI value as that of the active ISDN communication adapter to the layer 1 controller.

Further, in these operations, the above described information processing apparatus can easily grasp and manage redundant configuration in the ISDN communication control apparatus on the basis of TEI values and active/stand-by identifiers or respective ISDN communication adapters registered in the management table.

Further, by a simple method of ordering a stand-by ISDN communication adapter serving as a stand-by reserve for an active ISDN communication adapter used for communication to perform the communication processing and then ordering the active ISDN communication adapter to perform the same communication processing, it is possible to make the possibility of precedence of only the processing of the active ISDN communication adapter very little.

BRIEF DESCRIPTION OF THE DRAWINGS

Preferred embodiments of the present invention will now be described in conjunction with the accompanying drawings, in which:

FIGS. 3 and 6 are diagrams showing configurations of management tables used in redundant configuration management of ISDN communication adapters according to the present invention;

FIG. 12 is a block diagram showing another configuration of the ISDN communication adapter.

DESCRIPTION OF THE PREFERRED EMBODIMENTS

A first preferred embodiment of a communication system according to the present invention will hereafter be described.

Figure 1:
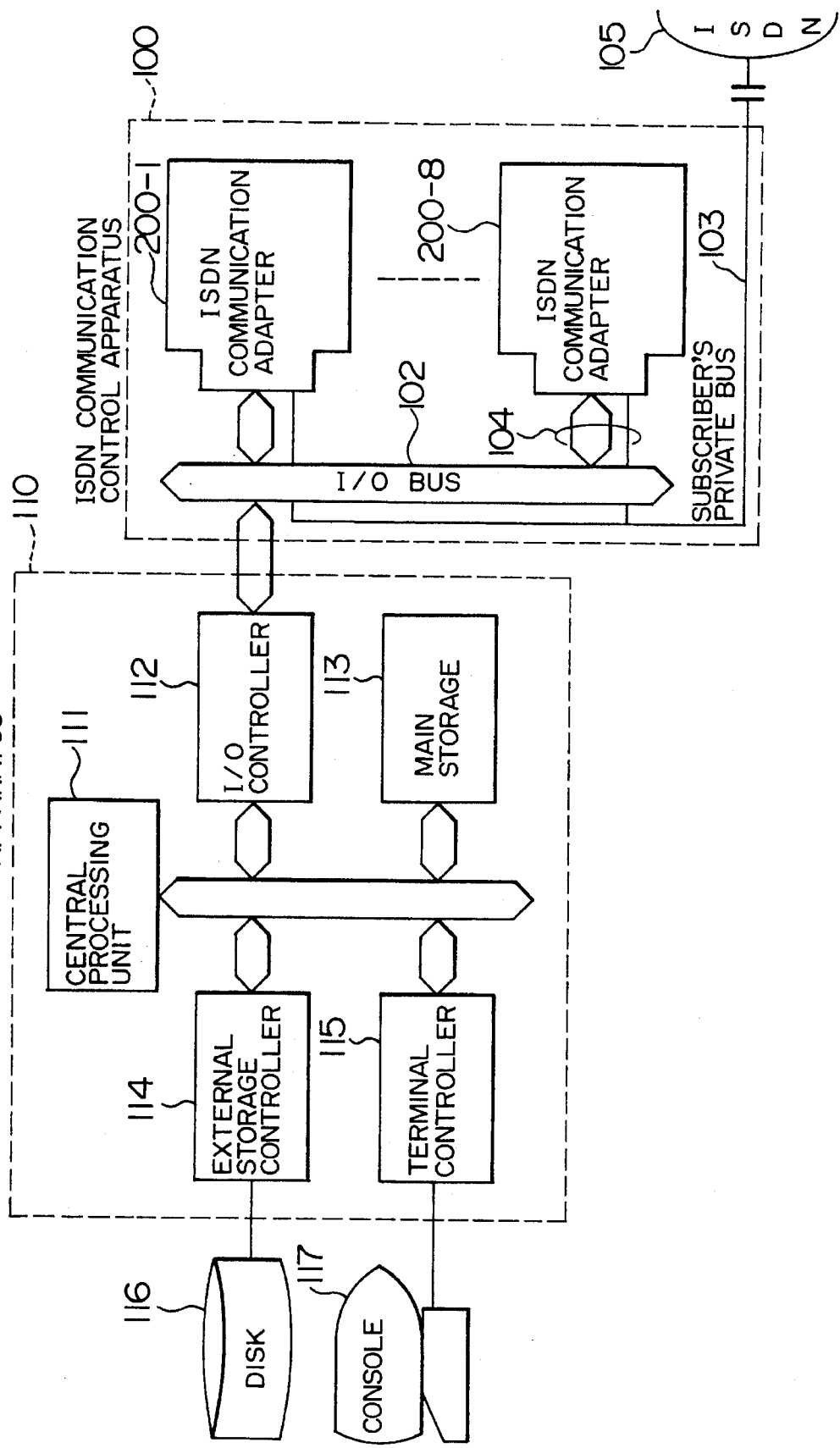
FIG. 1 is a block diagram showing the configuration of an ISDN communication system according to a first embodiment of the present invention.

FIG. 1 shows the configuration of a communication system according to the present invention.

In FIG. 1, numeral 100 denotes an ISDN communication control apparatus housing a plurality of ISDN communication adapters 200 for exercising communication control over ISDN lines, and numeral 110 denotes an information processing apparatus for transmitting/receiving data to/from the other party of communication via an ISDN 105, analyzing data, and managing the ISDN communication control apparatus 100.

In the information processing apparatus 110, numeral 111 denotes a central processing unit for executing various programs included in the information processing apparatus 110, and numeral 112 denotes an I/O controller for controlling an I/O bus 102 which is a data path to the ISDN communication adapters 200. Numeral 113 denotes a main storage for storing programs to be executed by the central processing unit 111 and various management information pieces, and numeral 114 denotes an external storage controller for controlling external storages such as a disk 116 to be used as the data base. Numeral 115 denotes a terminal controller for controlling a console 117 to be used for communication state display and maintenance manipulation.

In the ISDN communication control apparatus 100, numeral 104 denotes an adapter slot having contacts with respect to the I/O bus 102 and an ISDN subscriber's private bus 103.

Numeral 105 denotes an ISDN for providing communication lines to the communication system.

In the present preferred embodiment, the ISDN communication control apparatus 100 is formed in one casing.

That is to say, the ISDN communication adapters 200 are inserted into a plurality of adapter slots 104 having contacts with respect to the I/O bus 102 and the subscriber's private bus 103 provided on a mother board of the ISDN communication control apapratus 100.

Under the restriction of connection on the subscriber's private bus 103, the number of adapter slots 104 per ISDN communication control apparatus 100 housing one subscriber's private bus 103 is at least two and at most eight.

Figure 2:
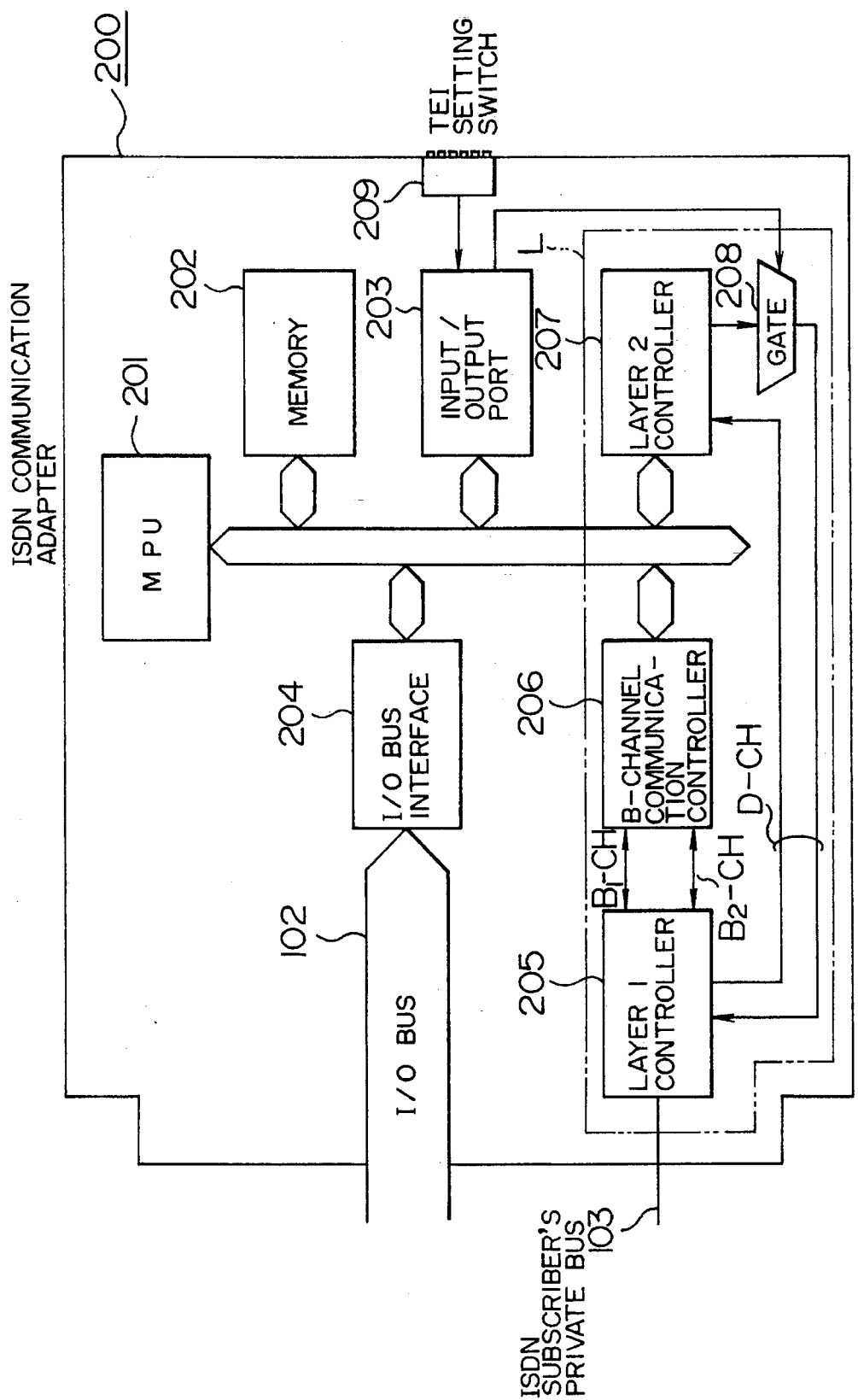
FIG. 2 is a block diagram showing the configuration of an ISDN communication adapter used in FIG. 1.

FIG. 2 shows the configuration of an ISDN communication adapter 200 included in the ISDN communication control apparatus 100 shown in FIG. 1.

In FIG. 2, numeral 201 denotes an MPU (Micro Processing Unit) for executing various programs such as communication control program, numeral 202 denotes a memory for storing programs, control information, data to be transmitted and received data, and numeral 204 denotes an I/O bus interface for exchanging control data, data to be transmitted, and received data with the I/O bus.

Further, numeral 205 denotes a layer 1 controller for performing establishment of signal synchronization on the ISDN subscriber's private bus 103, access competition control, and separation of B/D channels, numeral 206 denotes a B channel communication controller for exercising communication control over the B channel separated by the layer 1 controller 205, and numeral 207 denotes a layer 2 controller for controlling a link access procedure on the D channel (LAPD).

Numeral 203 denotes an input/output port. In response to orders given by the MPU 201, the input/output port 203 reads the value of a TEI setting switch 209 and outputs an opening/closing signal to a D-channel transmission gate 208. The above described TEI setting switch 209 has dip switches. In order to discriminate a terminal on the subscriber's private bus (an ISDN communication adapter 200 in case of the present embodiment), the value of TEI (Terminal Endpoint Identifier) used in LAPD control is set by the dip switches. The above described D-channel transmission gate 208 sends/stops a D-channel transmission signal supplied from the layer 2 controller 207. As indicated by a chain line, the layer 1 controller 205, the B-channel communication controller 206, the layer 2 controller 207, and the D-channel transmission gate 208 may be formed as one LSI.

The TEI playing an important role in the present embodiment will be described in more detail.

The TEI is used to discriminate which terminal an LAPD control frame (layer 2 frame) on the D channel shared by all terminals on the subscriber's private bus belongs to.

In Japan, for example, a value of at most 128 is permitted as the value of this TEI by the ISDN user-network interface of TTC standards so prescribed by corporation TTC (the Telecommunication Technology Committee) as to comply with CCITT Recommendation I. 441. As the TEI value set in the present preferred embodiment, however, a value ranging from 0 to 63 assigned as the value which can be set by the terminal side in case of typical point to point communication is used.

Figure 3:
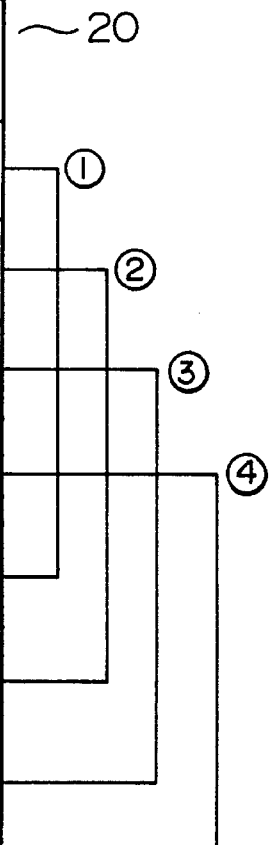

FIG. 3 shows the configuration of a communication adapter management table used in the information processing apparatus 110 to manage the redundant configuration of ISDN communication adapters in the ISDN communication apparatus 100.

The communication adapter management table 20 is stored in the main storage included in the information processing apparatus 110.

In FIG. 3, numeral 21 denotes a slot No. field for storing slot Nos. Each slot No. indicates the ID (Identification) of an adapter slot 104 for mounting an ISDN communication adapter 200. Numeral 22 denotes a TEI field representing the TEI values set in the ISDN communication adapters 200 corresponding to respective slot Nos. Numeral 23 denotes an operation mode field representing whether respective adapters are in the master mode or in the slave mode. Numeral 24 denotes an operation state field representing whether respective adapters are normally operating or not.

Master/slave relations between slots and operation states of slots are shown in FIG. 3. For example, slot Nos. 1 and 5 have master/slave relation ①. In the same way, slot Nos. 2 and 6 have master/slave relation ②, and slot Nos. 3 and 7 have master/slave relation ③. Slot Nos. 4 and 8 have master/slave relation ④.

It is assumed in the initial redundant configuration that all of eight ISDN communication adapters 200 mount ISDN communication adapters 200, the same TEI values are set in communication adapters corresponding to slot Nos. 1 to 4 and communication adapters corresponding to slot Nos. 5 to 8 in one-to-one correspondence, and slot Nos. 1 to 4 are in the master mode whereas slot Nos. 5 to 8 are in the slave mode. It is further assumed that the master mode has passed into the communication adapter corresponding to slot No. 7 because of operation abnormality in the communication adapter corresponding to slot No. 3. The resulting state is shown in FIG. 3.

Operation of a communication system according to the present preferred embodiment will hereafter be described.

Figure 4:
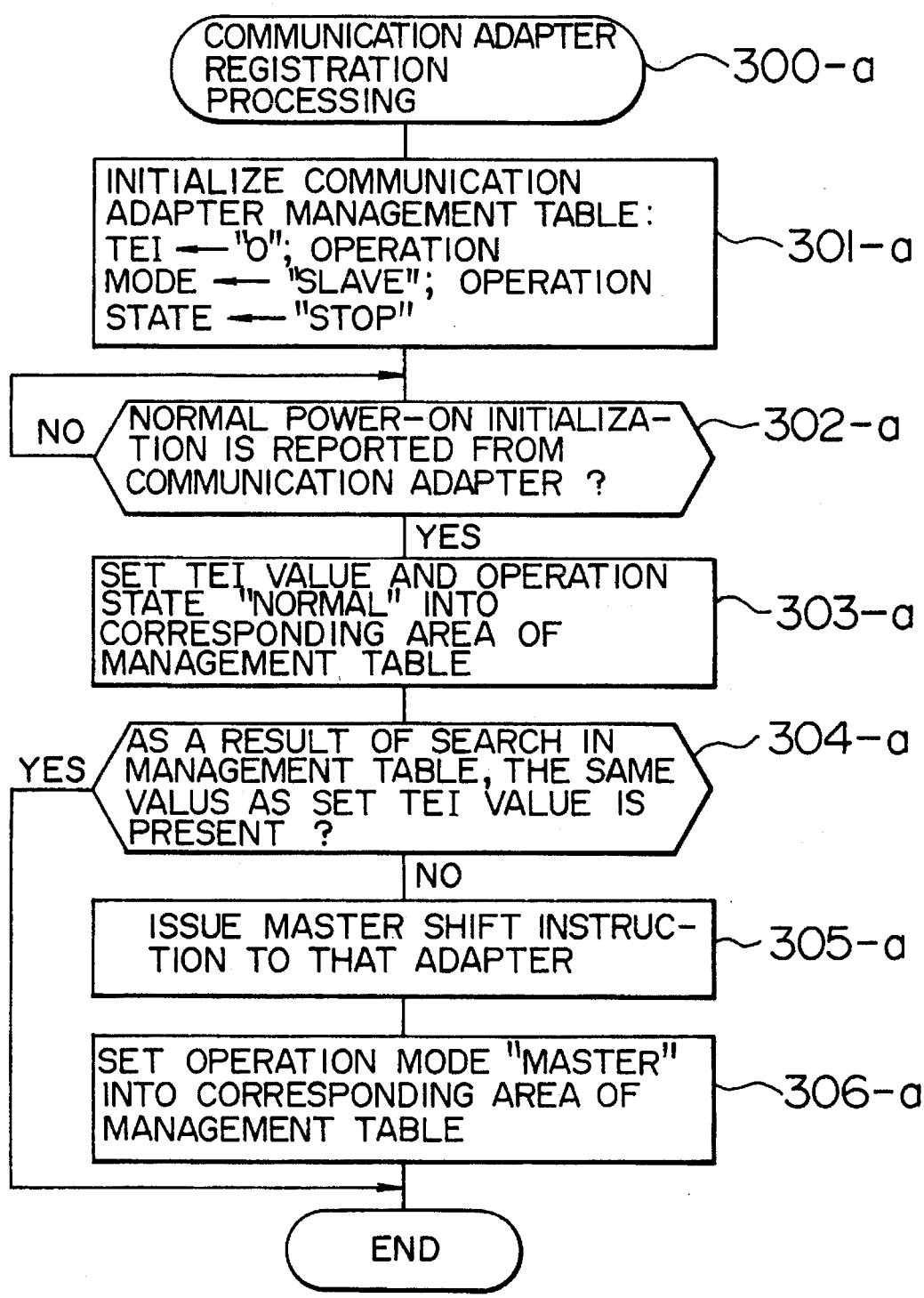
FIG. 4 is a flow chart showing a communication adapter registration processing procedure in an information processing apparatus according to the present invention.
Figure 5:
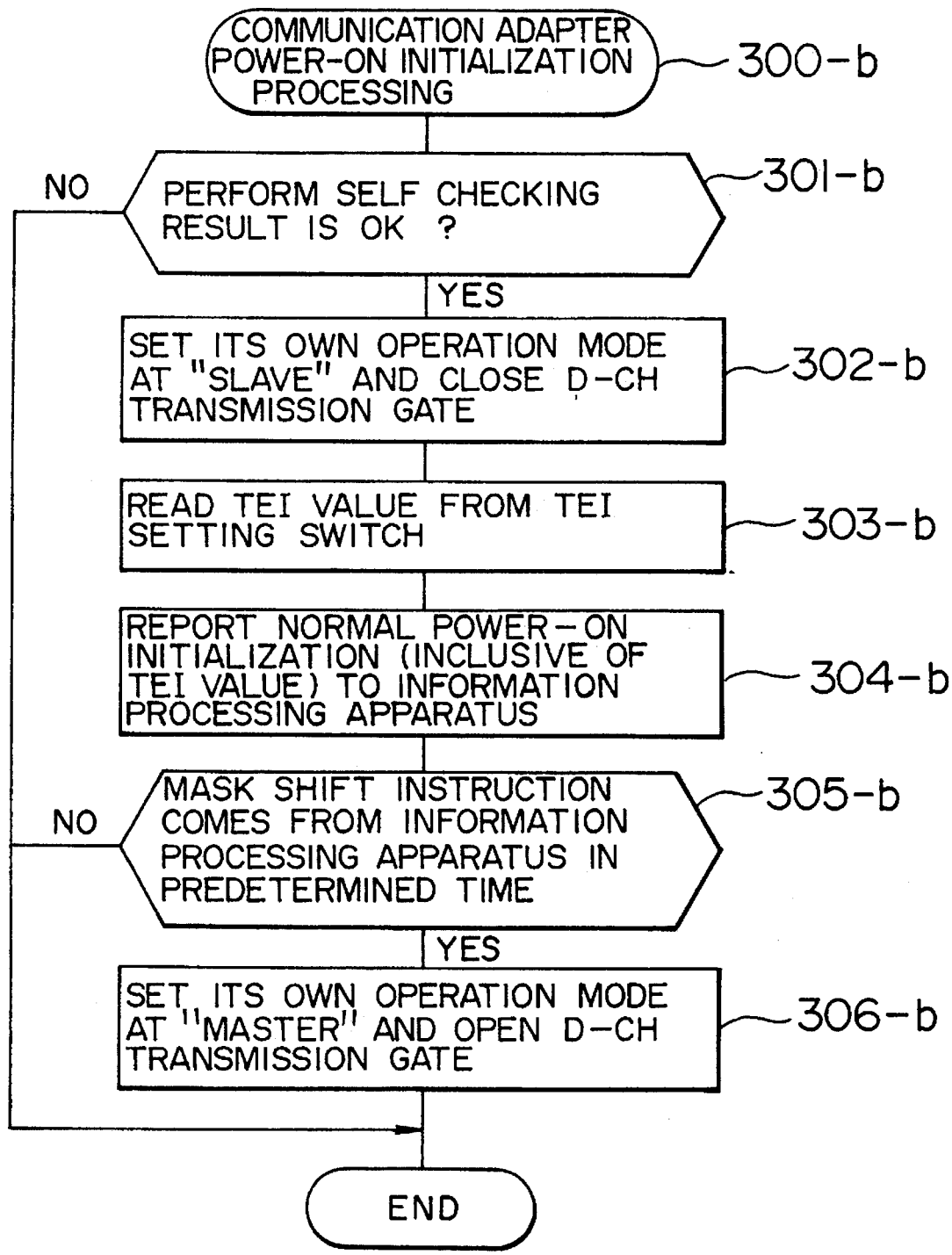
FIG. 5 is a flow chart showing a power-on initialization processing procedure in an ISDN communication adapter according to the present invention.

First of all, power-on initialization of the system and power-on initialization/registration processing of a communication adapter attendant upon extension of communication adapters (which can be manipulated on-line) will now be described by referring to communication adapter registration processing 300-a in the information processing apparatus 110 shown in FIG. 4 and communication adapter power-on initialization processing 300-b in an ISDN communication adapter 200 shown in FIG. 5.

At the time of power-on initialization of the system or when removal of a communication adapter from an adapter slot 104 has been detected (as a result of periodic access supervision of ISDN communication adapters 200 performed by the information processing apparatus 110), the information processing apparatus 110 sets all areas of the communication adapter management table 20 or the TEI field 22 of the corresponding slot number area equal to "0", sets the operation mode field 23 at the "slave" mode, and sets the operation state at "stop" (step 301-a). The communication adapter management table 20 is thus set at the initial state as shown in FIG. 6.

On the other hand, the ISDN communication adapter 200 performs self checking after it has been inserted (into on-line). If the result is normal, the power-on initialization processing is continued. If the result is abnormal, the power-on initialization processing is finished.

Further, in case of abnormality, a system manager is informed of the abnormality by means of lighting of an LED or the like to urge replacement of the communication adapter.

In case the result of self checking is normal, the communication adapter then sets its own operation mode at "slave", and closes the D-channel transmission gate 208 to prevent a signal sent out from the layer 2 controller 207 from emerging on the ISDCN subscriber's private bus 103 (302-b).

The communication adapter reads the TEI value set in the TEI setting switch 209 via the input/output port 203 (303-b), and registers that TEI value into the layer 2 controller 207. Thereafter, the communication adapter reports the normal power-on initialization of its own communication adapter and the TEI value preset to the information processing apparatus 110 (304-b). Alternatively, however, the information processing apparatus 110 may manage all TEI values and assign a TEI value to each ISDN communication adapter.

Upon receiving that report from the ISDN communication adapter 200 (302-a), the information processing apparatus 110 sets the reported TEI value into the TEI field of the corresponding slot No. area of the management table 20 and sets "normal" into the operation state field (303-a).

The information processing apparatus 110 refers to the management table 20 to determine whether the same TEI value as the reported TEI value is already registered (304-a). If the same TEI value is already registered, the information processing apparatus finishes the registration processing. If the same TEI value is not present, the information processing apparatus issues a master shift instruction to make that communication adapter master (305-a), and sets the operation mode field of the corresponding slot No. area of the management table 20 at "master" (306-a).

After reporting of normal power-on initialization to the information processing apparatus 110, the ISDN communication adapter 200 waits for the master shift instruction supplied from the information processing apparatus for a predetermined time (305-b). Upon receiving that master shift instruction, the ISDN communication adapter 200 sets its own operation mode at "master", and opens the D-channel transmission gate 208 via the input/output port (306-b).

If that instruction is not received, the ISDN communication adapter 200 recognizes that its own communication adapter has been initialized as a slave and finishes the power-on initialization processing.

In the present preferred embodiment, the information processing apparatus 110 sets the same TEI values in ISDN communication adapters 200 included in the communication control apparatus 100 in duplicate to form a redundant configuration and registers and manages master/slave modes.

Figure 7:
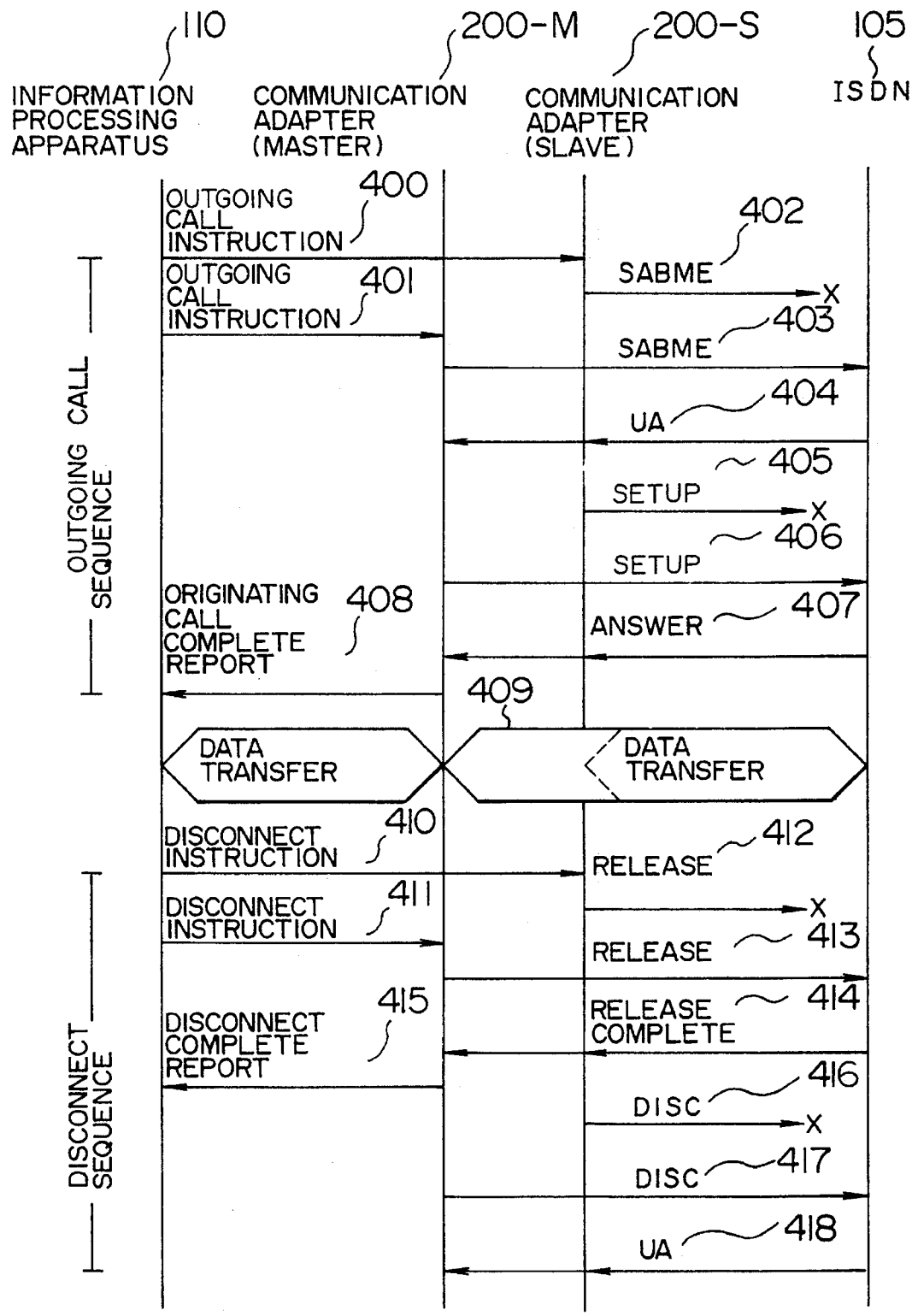
FIG. 7 is a sequence diagram showing an outgoing call/disconnect sequence in ISDN communication according to the present invention.
Figure 8:
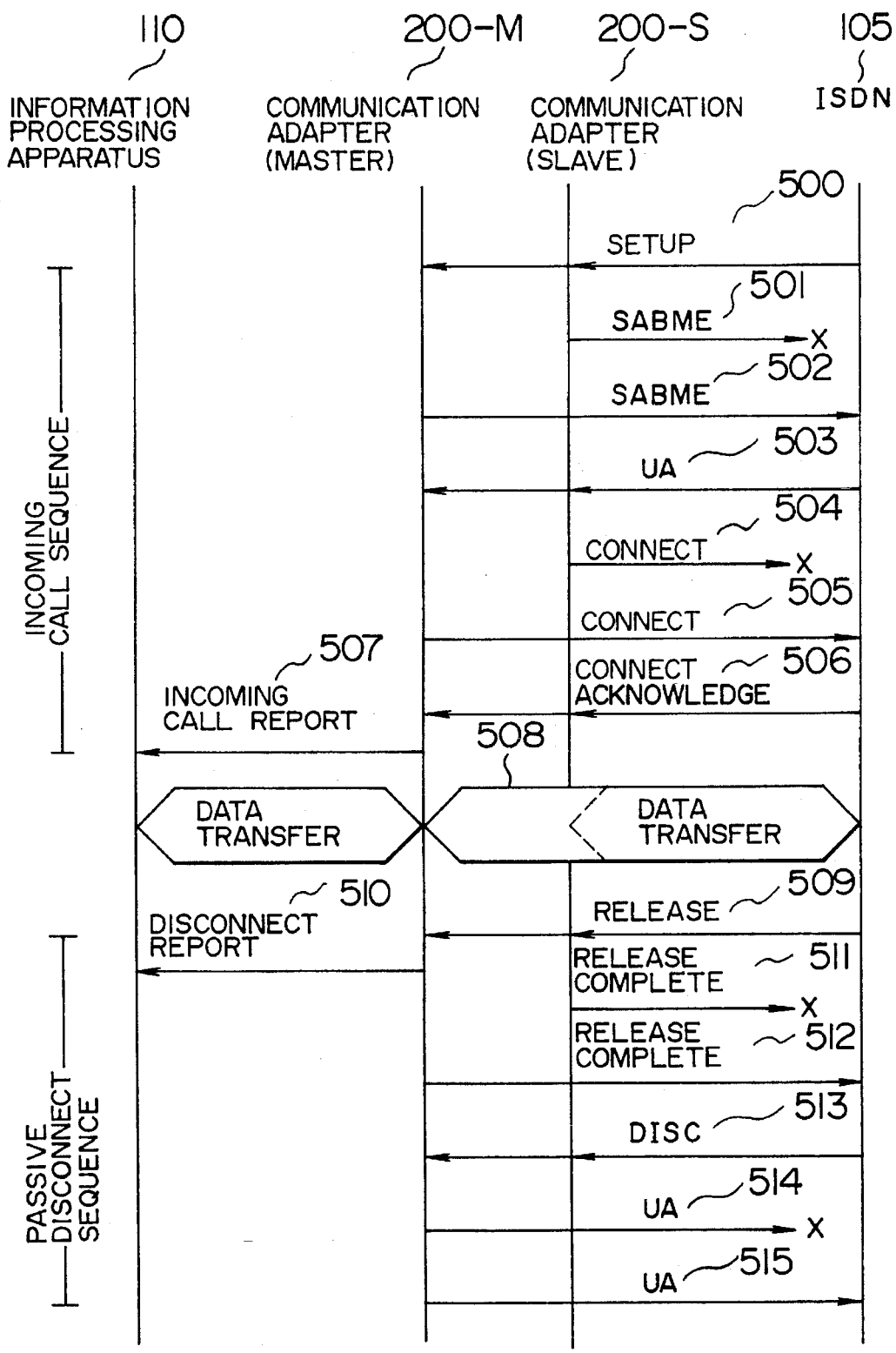
FIG. 8 is a sequence diagram showing an incoming call/passive disconnect sequence in ISDN communication according to the present invention.

Communication processing of ISDN communication adapters having master/slave modes registered by the processing heretofore described will now be described by referring to FIGS. 7 and 8. FIG. 7 shows a control information transfer sequence of for outgoing call/disconnect. FIG. 8 shows a control information transfer sequence for incoming call/passive disconnect.

In the outgoing call sequence, the information processing apparatus 110 first sends an outgoing call instruction to a communication adapter (slave) 200-S (400) and then sends an outgoing call instruction to a communication adapter (master) 200-M (401).

Upon receiving the outgoing call instructions, both the communication adapter 200-M and the communication adapter 200-S send an SABME (Set Asynchronous Balanced Mode Extended) frame to the ISDN 105 to establish a data link (402, 403).

All of control information pieces sent from the ISDN communication adapter 200 to the ISDN 105 are sent out from the layer 2 controller 207.

However, the SABME frame sent by the communication adapter (slave) 200-S is not sent to the ISDN 105 because the D-channel transmission gate (208 of FIG. 8) is closed.

This is true of all control information sent to the ISDN 105 by the layer 2 controller 207 of the communication adapter (slave) 200-S. Until the D-channel transmission gate 208 is opened at the time of switching from the slave mode to the master mode, such information is not sent to the ISDN 105. Upon receiving the SABME frame from the communication adapter (master) 200-M, the ISDN 105 returns an US (Unnumbered Acknowledgement) frame (404).

Control information sent from the ISDN 105 to the ISDN communication adapters 200 is received by only layer 2 controllers 207 having the same TEI value as the TEI value contained in that control information.

Therefore, both the communication adapter (master) 200-M and the communication adapter (slave) 200-S having the same TEI value set therein receive the same UA frame via the subscriber's private bus.

In the same way, control information sent from the ISDN 105 succeedingly is also received by the communication adapter (master) 200-M and the communication adapter (slave) 200-S having the same TEI value set therein.

Upon receiving the UA frame from the ISDN 105, both communication adapters send call setup messages to the ISDCN 105 to setup a call (405, 406). Upon receiving the call setup message from the communication adapter (master) 200-M, the ISDN 105 returns a connect message (407).

When both communication adapters have received the connect message from the ISDN 105, only the communication adapter (master) 200-M reports completion of the call operation to the information processing apparatus 110 (408). The outgoing call is thus established, and the information processing apparatus 110 performs data transfer by using the communication adapter (master) 200-M (409).

The communication adapter (slave) 200-S also receives data from the ISDN 105. In the present preferred embodiment, however, data thus received are discarded in the communication adapter (slave).

In the disconnect sequence, the information processing apparatus 110 first sends a disconnect instruction to a communication adapter (slave) 200-S (410) and then sends a calling instruction to a communication adapter (master) 200-M (411).

Upon receiving the disconnect instruction, both communication adapters send release messages to the ISDN 105 to release the call (412, 413).

Upon receiving the release message from the communication adapter (master) 200-M, the ISDN 105 returns a release complete message (414).

When both communication adapters have received the release complete message, only the communication adapter (master) 200-M reports the completion of disconnect to the information processing apparatus (415).

Both communication adapters sends DISC (Disconnect) frames to the ISDN to release the data link (416, 417). Upon receiving the DISC frame from the communication adapter (master) 200-M, the ISDN 105 returns the UA frame (418). In this way, the call is released.

In the present preferred embodiment, the information processing apparatus can thus bring the communication state of the slave communication adapter to the same communication state as that of the master by only issuing the outgoing call/disconnect instruction to the master/slave communication adapter twice in the outgoing call/disconnect sequence shown in FIG. 7.

In the incoming call sequence shown in FIG. 8, a call setup message is first sent from the ISDN 105 to communication adapters (500). Upon recieving that call setup message, both the communication adapters 200-M and 200-S send SABME frames to the ISDN 105 (501, 502).

Upon receiving the SABME frame from the communication adapter (master) 200-M, the ISDN 105 returns a UA frame (503).

Upon receiving this UA frame, both communication adapters send connect messages to the ISDN 105 (504, 505). Upon receiving the connect message from the communication adapter (master) 200-M, the ISDN 105 returns a connect acknowledge message (506).

When both communication adapters have received this connect acknowledge message, only the communication adapter (master) 200-M makes an incoming call report to the information processing apparatus 110 (507).

The incoming call is thus established, and the information processing apparatus 110 performs data transfer by using the communication adapter (master) 200-M (508).

Further, in the passive disconnect sequence, a release message is first sent from the ISDN 105 (509). When both communication adapters 200-M and 200-S have received this release message, only the communication adapter (master) 200-M makes a disconnect report to the information processing apparatus 110 (510) and sends a release complete message to the ISDN 105 (511, 512).

Upon receiving the release complete message from the communication adapter (master) 200-M, the ISDN 105 sends a DISC frame to the communication adapter (513). Upon receiving this DISC frame, each of both communication adapters sends a UA frame to the ISDN 105 (514, 515). The incoming call is thus released.

As heretofore described, the information processing apparatus in the present preferred embodiment can execute communication processing in the incoming call/passive disconnect sequence without using special means for redundant configuration of communication adapters.

Figures 9, 10:
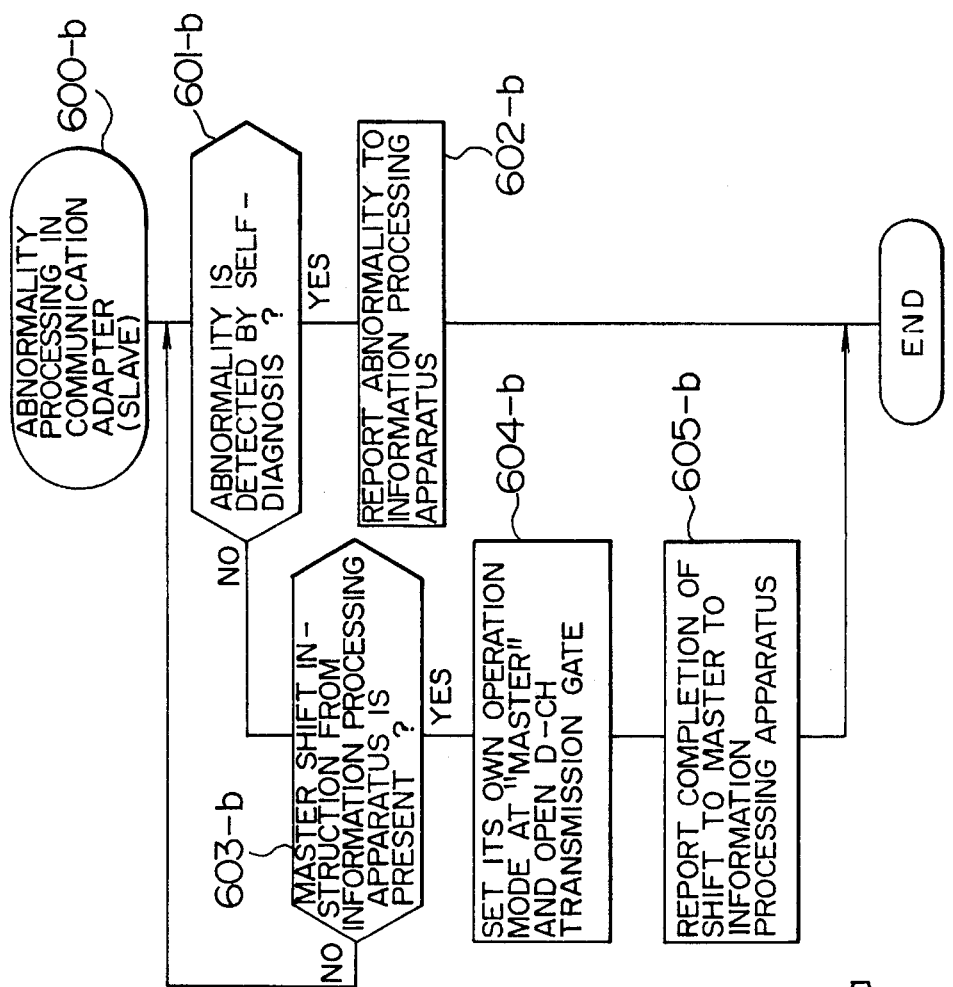
FIG. 9 is a flow chart showing an abnormality processing procedure of an ISDN communication adapter (master)
FIG. 10 is a flow chart showing an abnormality processing procedure of an ISDN communication adapter (slave)
Figure 11:
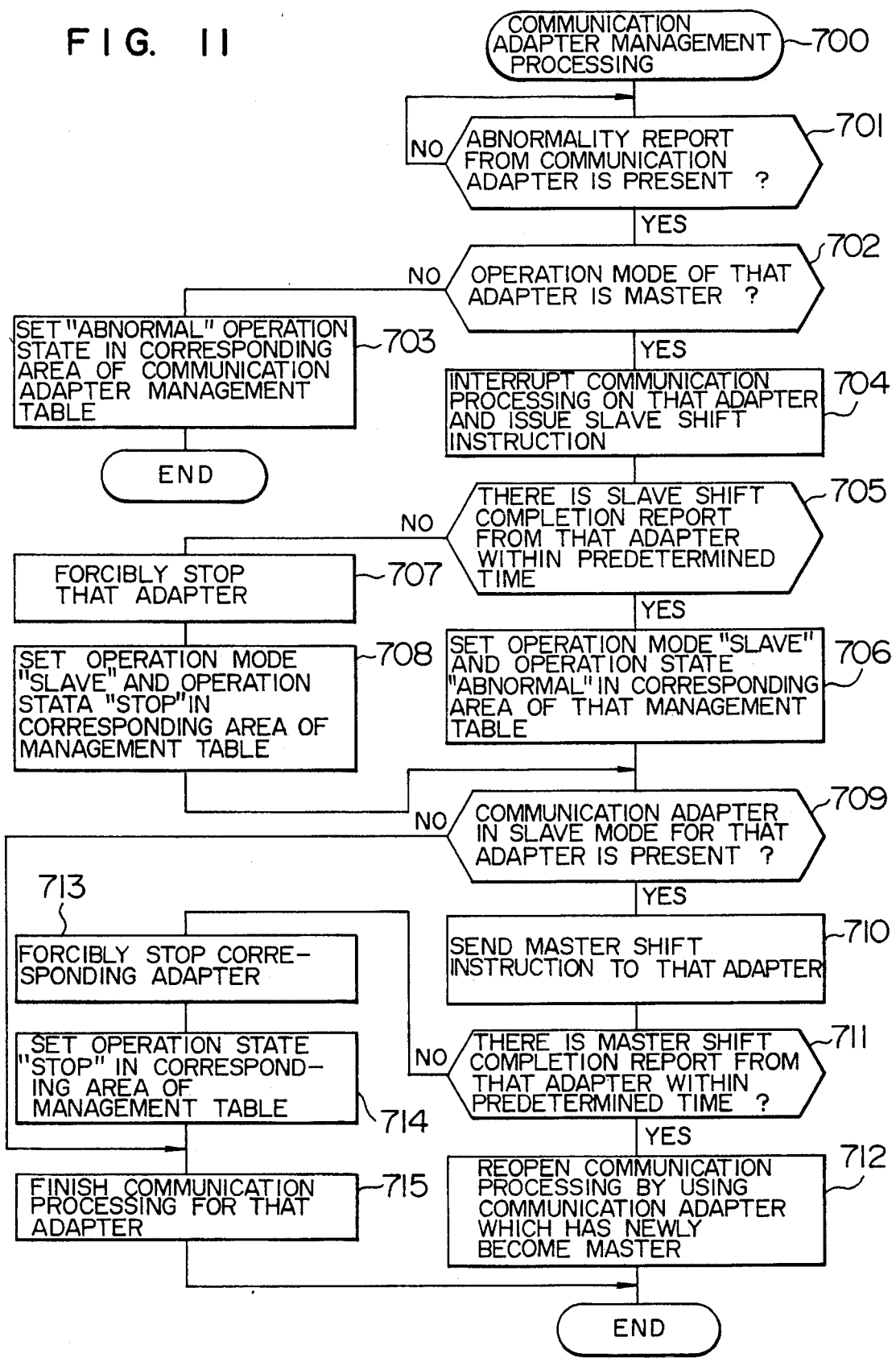
FIG. 11 is a flow chart showing an abnormality management processing procedure of ISDN communication adapter in an information processing apparatus.

Recovery processing performed when an abnormality has occurred in a communication adapter in the redundant configuration state in which the master/slave modes a communication adapters are registered and managed will hereafter be described by referring to abnormality processing (600-a, 600-b) performed by an ISDN communication adapter in the master and slave modes as shown in FIGS. 9 and 10 and management processing (700) of an abnormal communication adapter performed in the information processing apparatus as shown in FIG. 11.

In the abnormality processing performed in an ISDN communication adapter 200 as shown in FIGS. 9 and 10, it is determined by self-diagnosis whether an abnormality is present no matter whether the operation mode of that ISDN communication adapter is in the master mode or in the slave mode (601-a, 601-b).

If an abnormality has been detected, the ISDN communication adapter reports an abnormality to the information processing apparatus (602-a, 602-b).

Thereafter, the communication adapter (master) waits for a slave shift instruction coming from the information processing apparatus 110 (603-a). On the other hand, the communication adapter (slave) finishes the abnormality processing.

Upon receiving the slave shift instruction from the information processing apparatus 110, the communication adapter (master) sets its own operation mode at "slave", closes the D-channel transmission gate (208 of FIG. 2) (604-a), and reports the completion of its shift to the slave mode to the information processing apparatus 110 (605-a).

On the other hand, if an abnormality is not detected in the communication adapter (slave) by self-diagnosis, the communication adapter (slave) determines whether it has received a master shift instruction from the information processing apparatus 110 (603-b).

Unless a master shift instruction has been received, the communication adapter (slave) performs self-diagnosis continuously. If a master shift instruction has been received, the communication adapter (slave) sets its own operation mode at "master", opens the D-channel transmission gate (604-b), and reports the completion of its shift to the master mode to the information processing apparatus 110 (605-b).

Communication adapter abnormality management processing performed in the information processing apparatus will now be described. First of all, the information processing apparatus checks whether an abnormality report made by a communication adapter is present (701). If present, the information processing apparatus 110 determines whether the operation mode of that communication adapter is in the master mode by referring to the communication adapter management table 20 (702).

If that communication adapter is a slave, the information processing apparatus sets "abnormal" in the operation state field 24 of the corresponding slot No. area in the management table 20 (703), and finishes the processing with respect to that communication adapter.

On the other hand, if the operation mode is master, the information processing apparatus temporarily interrupts the communication processing with respect to that communication adapter (such as data transfer) and sends a slave shift instruction to that communication adapter (704).

Thereafter, the information processing apparatus checks whether it has received a slave shift completion report from that communication adapter within a predetermined time (705). If the report has already been received, the information processing apparatus sets "slave" in the operation mode field 23 of the corresponding slot No. area in the management table 20, and sets "abnormal" in the operation state field 24 of that slot No. area (706). Unless the report has already been received, the information processing apparatus forcibly stops the operation of that communication adapter (707), sets "slave" in the operation mode field 23 of the corresponding slot No. of the management table 20 and sets "stop" in the operation state field 24 of that slot No. (708).

The information processing apparatus refers to the management table 20 and checks whether there is a communication adapter, which has the same TEI value as that communication adapter has and which is in the "slave" operation mode (709). If such a communication adapter is present, the information processing apparatus sends a master shift instruction to that communication adapter (710) and waits for a report of completion of shift to the master sent from that communication adapter for a predetermined time (711).

Unless there is a communication adapter of slave mode, the information processing apparatus regards recovery from the abnormality as impossible and finishes the communication processing for the abnormal communication adapter (715).

If a master shift completion report is made within a predetermined time, communication processing is reopened by using the communication adapter which has newly become a master (712).

Unless there is a master shift completion report, the information processing apparatus forcibly stops the operation of the above described communication adapter which has issued the master shift instruction (713), sets "stop" in the operation state field 24 of the corresponding slot No. in the management table 20 (714), and finishes the communication processing for the abnormal communication adapter (715).

In the present preferred embodiment, the information processing apparatus 110 can recover the communication processing by thus shifting a slave communication adapter to the master mode upon occurrence of an abnormality in a communication adapter.

For convenience of description, the present preferred embodiment has heretofore been described by taking the case where an abnormality in a communication adapter is detected by the self checking function of the communication adapter as an example. However, the abnormality detection means is not limited to the self checking function. When other abnormality detection means is used, recovery from trouble can be attained in the same way.

Alternatively, eight layer 2 controllers may be provided within an ISDN communication adapter 200 so that one ISDN communication adapter may operate as slaves for a plurality of ISDN communication adapters by setting respectively different TEI values in those eight layer 2 controllers 207.

In FIG. 12, numeral 901 denotes a D-channel management section. The D-channel management section 901 sets TEI values sent from the information processing apparatus 110 into the layer 2 controllers 207-1 to 207-8, and exercises the master/slave management. An 8×1 (8-input 1-output) matrix switch 902 selects a signal to be outputted to the layer 1 controller 205 out of signals sent out from respective layer 2 controllers 207-1 to 207-8. With the advance of the master/slave management, the D-channel management section 901 also switches the 8×1 matrix switch 902. Other components are identical with those denoted by like characters in FIG. 2.

In this case, eight TEI values set in respective layer 2 controllers 207 are so managed in one ISDN communication adapter 200 by the information processing apparatus 110 that duplication may be avoided. The ISDN communication adapters 200 are ordered to have specified values.

Figure 13:
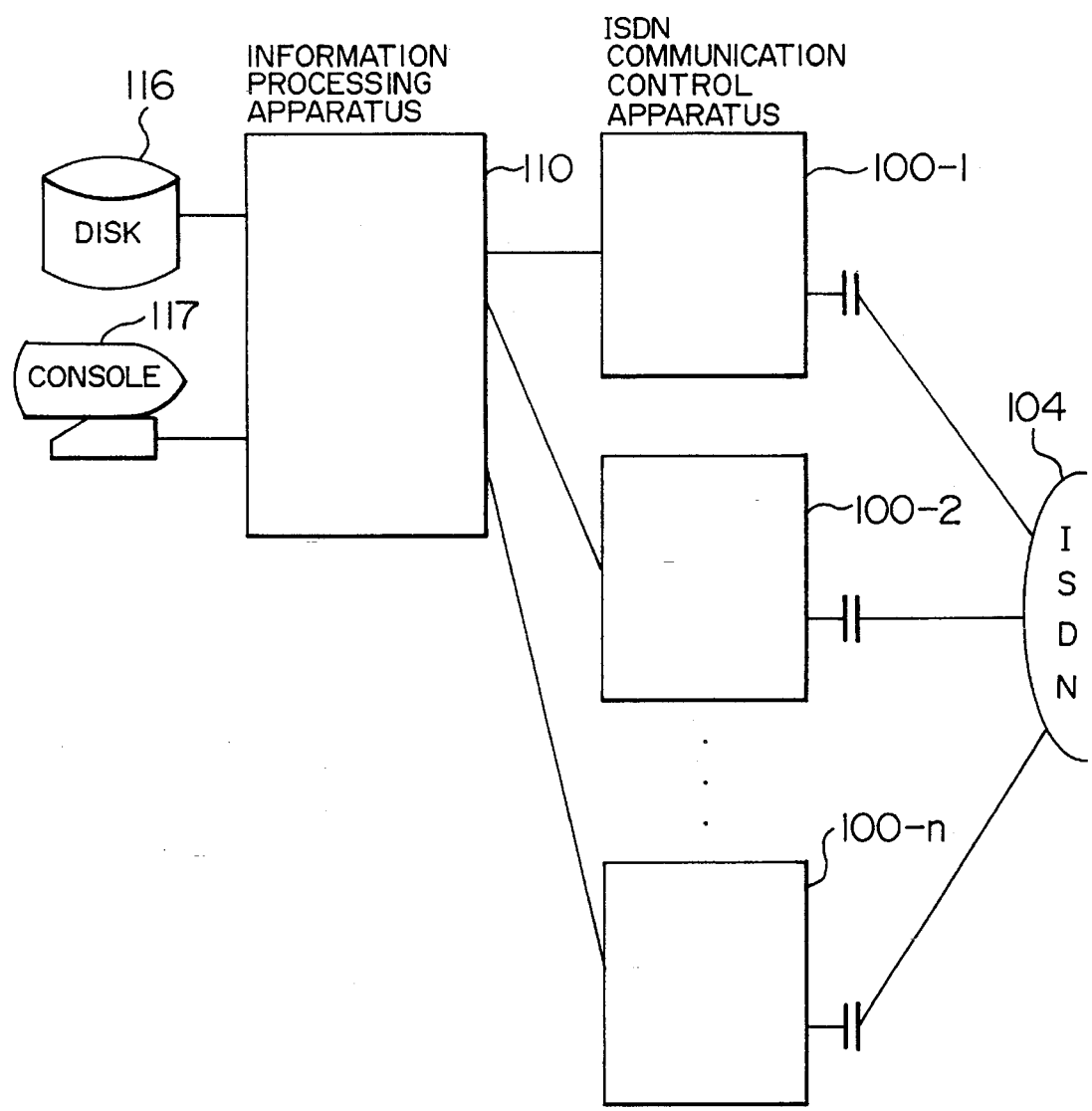
FIG. 13 and FIG. 14 are block diagrams showing another configuration of an ISDN communication system according to the present invention.

In the system configuration of the present preferred embodiment, only one ISDN communication control apparatus 100 is connected to the information processing apparatus 110. As shown in FIG. 13, however, a plurality of ISDN communication control apparatuses 100-1 to 100-n may be connected to one information processing apparatus. In this case, as many communication adapter management tables 20 as there are connected ISDN communication control apparatuses are provided on the main storage 113 in the information processing apparatus 110 to exercise management.

Figure 14:
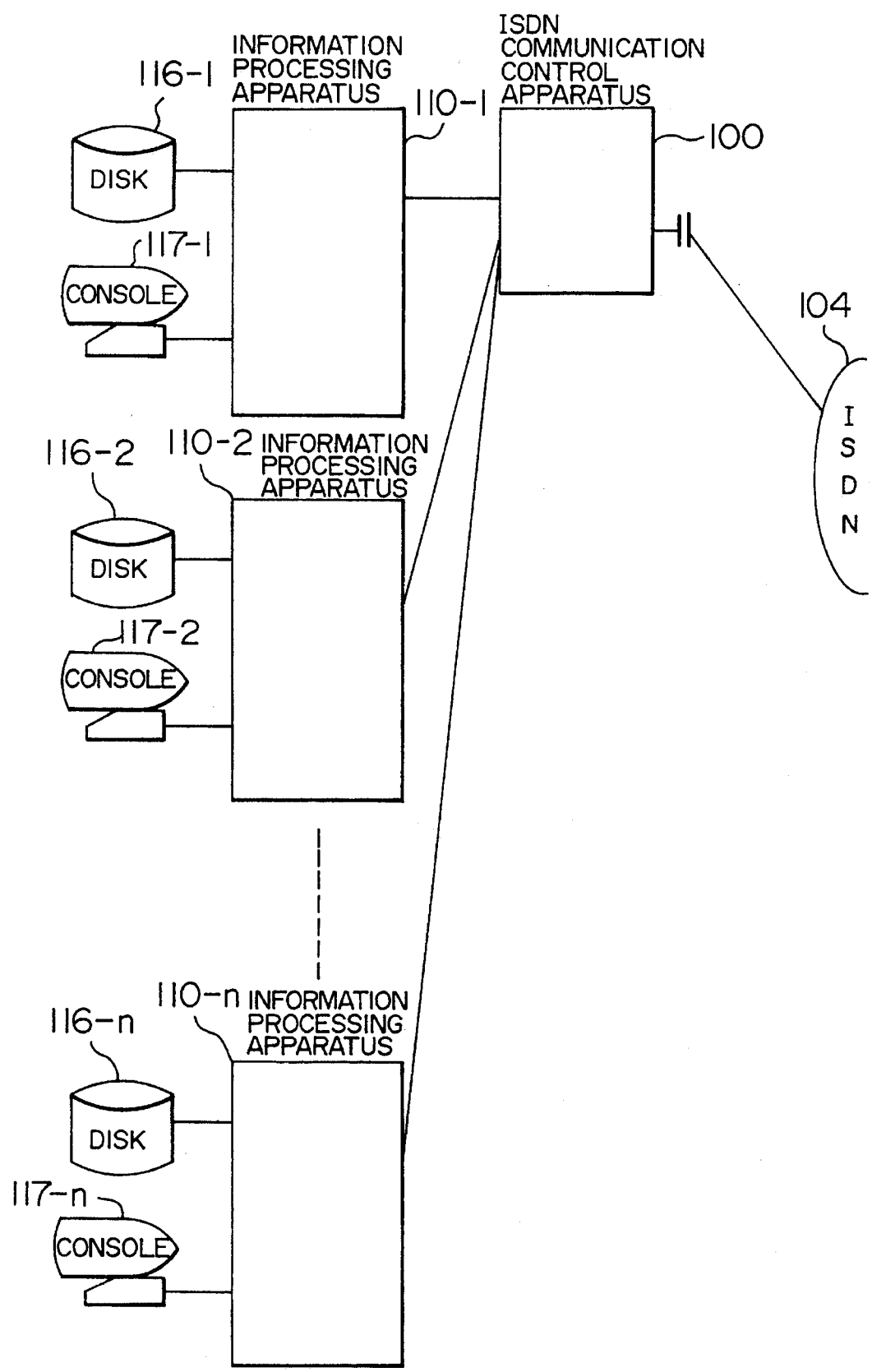

On the contrary, a plurality of information processing apparatuses 110-1 to 110-n may be connected to one ISDN communication control apparatus 100 as shown in FIG. 14.

In this case, it is desirable that management of communication adapters is exercised in the ISDN communication control apparatus 100.

That is to say, in the preferred embodiment heretofore described, the communication adapter management table is provided in the information processing apparatus, and in addition the information processing apparatus issues master/slave orders. However, a similar management mechanism may be provided in the ISDN communication control apparatus to realize these functions. In this case, the information processing apparatus recognizes only master ISDN communication adapters and issues orders only to the masters. Therefore, this management mechanism functions to issue orders to slaves and perform synchronization of orders sent to masters.

As heretofore described, the redundant configuration of ISDN communication adapters in the ISDN communication control apparatus can be automatically registered and managed by the information control apparatus in the present embodiment. As a result, construction of a communication system having a redundant configuration is facilitated.

Further, in performing data communication, it is possible to automatically switch ISDN communication adapters to the slave mode in the information processing apparatus to continue data communication without making the other party of communication conscious of an abnormality and without establishing a new call.

Therefore, reliability of electronic information processing organizations can be enhanced in fields of on-line transaction processing using ISDN which needs perpetuity, and in particular in public institutions widely accessed.

For convenience of description, duplicated configuration has been used in the present preferred embodiment as described above. In the duplicated configuration, master ISDN communication adapters and slave ISDN communication adapters are provided in one-to-one correspondence. In accordance with the present invention, however, a redundant configuration with a multiplexing factor n having a plruality of slaves associated with one master ISDN communication adapter can also be realized by similar processing.

As heretofore described, the present invention brings about excellent effects:

1. Highly reliable data communication using ISDNs is attained.
2. When a trouble has occurred in an adapter of an ISDN line, recovery processing can be rapidly executed without making the other party of communication conscious of it.

We claim:

1. A trouble processing method for an ISDN communication system connected to an ISDN, said ISDN communication system having a plurality of ISDN communication adapters, wherein at least one of said ISDN communication adapters is an active ISDN communication adapter being in an active state and having assigned thereto a certain terminal endpoint identifier (TEI) value and at least another one of said ISDN communication adapters is a stand-by ISDN communication adapter being in an inactive state, said method comprising the steps of:

assigning a same TEI value as that of said active ISDN communication adapter to said stand-by ISDN communication adapter;

making said stand-by ISDN communication adapter, when activated, to operate in the same way as said active ISDN communication adapter and causing an interruption of transmission of an LAPD frame from said stand-by ISDN communication adapter to said ISDN;

maintaining said stand-by ISDN communication adapter in, while in the inactive state, a same communication state as that of said active ISDN communication adapter; and upon occurrence of trouble in said active ISDN communication adapter, releasing, in said stand-by ISDN communication adapter, interruption of transmission of an LAPD frame from said stand-by ISDN communication adapter to said ISDN and activating said stand-by ISDN communication adapter to operate as the active ISDN communication adapter.

2. A trouble processing method for ISDN communication system according to claim 1, wherein said ISDN communication system includes an ISDN communication control apparatus which includes said ISDN communication adapters, wherein said active ISDN communication adapter is designated as a master and said stand-by ISDN communication adapter is designated as a slave and wherein said method further comprises the steps of:

when an outgoing call/disconnect instruction is to be sent to said master and said slave ISDN communication adapters in an outgoing call/disconnect sequence for exercising setup/release control on an ISDN communication line, sending the outgoing call/disconnect instruction to said slave ISDN communication adapter and then sending the same instruction to said master ISDN communication adapter.

3. A control apparatus for controlling communication between an information processing apparatus and communication lines of an ISDN, said control apparatus being connected between said ISDN and said information processing apparatus, said ISDN including an ISDN subscriber's private bus which is connected between said communication lines and said control apparatus, said control apparatus comprising:

an ISDN communication control apparatus including a plurality of ISDN communication adapters connected to said ISDN subscriber's private bus of said ISDN; and an I/O bus coupled between said ISDN communication adapters and said information processing apparatus, each ISDN communication adapter comprises:
- a layer 1 controller taking charge of processing of a first layer 1 based on a communication protocol which controls communication between said information processing apparatus and said communication lines of said ISDN,
- a layer 2 controller taking charge of processing of a second layer 2 based on the communication protocol and transmitting LAPD frame data to said layer 1 controller,
- gate means connected between said layer 1 and layer 2 controllers for interrupting transmission of said LAPD frame data from said layer 2 controller to said layer 1 controller based on a TEI value; and
- a TEI setting switch for permitting said TEI value to be arbitrarily set in said each ISDN communication adapter 4. A control apparatus according to claim 3, wherein said TEI setting switch comprises dip switches.

5. A control apparatus according to claim 3, wherein said each ISDN communication adapter further comprises:
- a plurality of layer 2 controllers, in addition to said layer 2 controller for transmitting said LAPD frame data to said layer 1 controller and in which said TEI value can be set by said TEI setting switch, wherein said gate means comprises:
- switch means for interrupting transmission of said LAPD frame from said plurality of layer 2 controllers or coupling selectively said LAPD frame data to said layer 1 controller based on said TEI value.

6. A control apparatus according to claim 3, wherein one of said ISDN communication adapters is provided as an active ISDN communication adapter and another one of said ISDN communication adapters is provided as a stand-by ISDN communication adapter,
- wherein said stand-by ISDN communication adapter has the same TEI value as said active ISDN communication adapter,
- wherein gate means, in said stand-by ISDN communication adapter, interrupts transmission of LAPD frame data under normal conditions, and
- wherein said information processing apparatus coupled to said I/O bus comprises:
- a management table for registering therein TEI values in corresponding relation to active/stand-by identifiers of said ISDN communication adapters;
- means for sending a communication processing order to said ISDN communication control apparatus by referring to said management table, ordering said stand-by ISDN communication adapter to perform said communication processing, and thereafter ordering said active ISDN communication adapter to perform the same communication processing; and
- means, responsive to a trouble in said active ISDN communication adapter, for referring to said management table and ordering said gate means of said stand-by ISDN communication adapter to cancel the interruption of transmission of LAPD frame data.

7. A control apparatus according to claim 6, wherein in response to a trouble in an active ISDN communication adapter of said plurality of ISDN communication adapters included in said ISDN communication control apparatus, said information processing apparatus automatically shifts a stand-by ISDN communication adapter of said plurality of ISDN communication adapters to an active mode and causes a recovery of communication processing.

8. A control apparatus according to claim 3, wherein said information processing apparatus comprises:
- means for setting the same TEI values in at least two of said ISDN communication adapters included in said ISDN communication control apparatus to form a redundant configuration and performing master/slave registration and management.

9. A control apparatus of ISDN communication system according to claim 8, wherein an abnormality in said active ISDN communication adapter is detected by self-diagnosis function of said active ISDN communication adapter.

10. A control apparatus of an ISDN communication system comprising:
- an information processing apparatus;
- an active ISDN communication adapter, connected to an ISDN subscriber's private bus and having a TEI value set therein, for controlling communication between said information processing apparatus and an ISDN;
- a stand-by ISDN communication adapter connected to the same ISDN subscriber's private bus as that of said active ISDN communication adapter, having the same TEI value set therein as that of said active ISDN communication adapter, said stand-by ISDN communication adapter including gate means for interrupting a transmission of an LAPD frame from said stand-by ISDN communication adapter to said ISDN under normal conditions; and
- means responsive to a trouble in said active ISDN communication adapter to cancel the transmission interruption of the LAPD frame performed by said gate means of said stand-by ISDN communication adapter.

11. A control apparatus for controlling communication with an ISDN, comprising:
- an information processing apparatus for creating, processing and storing communication data;
- an ISDN communication control apparatus, connected to said information processing apparatus by an input/output (I/O) bus which is a transfer route of data, said ISDN communication control apparatus having a plurality of ISDN communication adapters, each ISDN communication adapter having layer 1 and layer 2 controllers of Open Systems Interconnect (OSI) reference model for controlling at least ISDN communication processing with one ISDN subscriber line of said ISDN and said I/O bus;
- means, included in said information processing apparatus, for requesting setup/release processing of ISDN communication to an active ISDN communication adapter of said plurality of ISDN communication adapters included in said ISDN communication control apparatus and sending an outgoing call/disconnect instruction requesting said processing of ISDN communication from said information processing apparatus to said active ISDN communication adapter, said active ISDN communication adapter having set therein a certain TEI value; and
- means included in said information processing apparatus, after sending said outgoing call/disconnect instruction requesting said processing of ISDN communication from said information processing apparatus to said active ISDN communication adapter of said plurality of ISDN communication adapters included in said ISDN communication control apparatus, for sending a same outgoing call/disconnect instruction being sent to said active ISDN communication adapter to a stand-by communication adapter, said stand-by ISDN communication adapter having set therein a same identifying value or TEI value as that of said active ISDN communication adapter.

12. A control apparatus of ISDN communication system according to claim 11, wherein said information processing apparatus sets the same TEI values in said ISDN communication adapters included in said ISDN communication control apparatus to form a redundant configuration and perform registration and management in master/slave status of said ISDN communication adapters.

13. A control apparatus for controlling communication with an ISDN, comprising:

an information processing apparatus for creating, processing and storing communication data;

an ISDN communication control apparatus, connected to said information processing apparatus by an input/output (I/O) bus which is a transfer route of data, said ISDN communication control apparatus having a plurality of ISDN communication adapters, each ISDN communication adapter having layer 1 and layer 2 controllers of Open Systems Interconnect (OSI) reference model for controlling at least ISDN communication processing with one ISDN subscriber line of said ISDN and said I/O bus;

wherein each ISDN communication adapter further comprises:

gate means for interrupting only a transmission of communication data from said layer 2 controller to said layer 1 controller based on a TEI value; and a TEI setting switch for permitting said TEI value to be arbitrarily set in said ISDN communication adapter for identifying plural terminals on an ISDN subscriber line of said ISDN.

14. A control apparatus according to claim 12, wherein said ISDN communication adapter further comprises:

in additional to said layer 2 controller, a plurality of layer 2 controllers for transferring of communication data to said layer 1 controller and in which said TEI value can be set, and wherein said gate means comprises:

switch means for interrupting transmission of communication data from said plurality of layer 2 controllers to said layer 1 controller or coupling selectively said communication data to said layer 1 controller based on said TEI value.

15. A control apparatus of ISDN communication system according to claim 12, wherein said ISDN communication adapters included in said ISDN communication control apparatus includes an active ISDN communication adapter and a stand-by ISDN communication adapter which has the same TEI value set therein as said active ISDN communication adapter, wherein said gate means interrupts transmission of communication data under normal conditions, and wherein said information processing apparatus comprises:

a management table for registering therein TEI values in corresponding relation to active/stand-by identifiers of said ISDN communication adapters;

means for sending a communication processing order to said ISDN communication control apparatus by referring to said management table, ordering said stand-by ISDN communication adapter to perform said communication processing, and thereafter ordering said active ISDN communication adapter to perform the same communication processing; and means responsive to a trouble in said active ISDN communication adapter to refer to said management table and order said gate means of said stand-by ISDN communication adapter to cancel the interruption of transmission of communication data.

16. A control apparatus according to claim 15, wherein in response to a trouble in said active ISDN communication adapter in a master status included in said ISDN communication control apparatus, said information processing apparatus automatically shifts said stand-by ISDN communication adapter in a slave status to said master status and causes a recovery of communication processing.

17. A control apparatus for controlling communication with an ISDN having an ISDN subscriber line, comprising:

an information processing apparatus;

an ISDN communication control apparatus, having an I/O bus which is connected to said information processing apparatus and a plurality of ISDN communication adapters, for connecting said ISDN communication adapters to said I/O bus and said ISDN subscriber line;

wherein at least one of said ISDN communication adapters is an active ISDN communication adapter, connected to said ISDN subscriber line and having a value set therein for identifying plural terminals connected to said ISDN subscriber line, said active ISDN communication adapter controls communication between said information processing apparatus and said ISDN subscriber line;

wherein at least another one of said ISDN communication adapters is a stand-by ISDN communication adapter connected to the same ISDN subscriber line as that of said active ISDN communication adapter, and having the same identifying value set therein as that of said active ISDN communication adapter, said stand-by ISDN communication adapter including gate means for interrupting a transmission of communication data from said stand-by ISDN communication adapter to said ISDN under normal conditions; and means responsive to a trouble in said active ISDN communication adapter to cancel the interruption of transmission of communication data performed by said gate means of said stand-by ISDN communication adapter.

* * * * *